(12) United States Patent
Wang et al.

(10) Patent No.: US 10,423,966 B2
(45) Date of Patent: *Sep. 24, 2019

(54) METHOD AND SYSTEM FOR ONLINE HELPDESK

(71) Applicants: Lu Wang, Sunnyvale, CA (US); Jinsheng Wang, Sunnyvale, CA (US)

(72) Inventors: Lu Wang, Sunnyvale, CA (US); Jinsheng Wang, Sunnyvale, CA (US)

(*) Notice: Subject to any disclaimer, the term of this patent is extended or adjusted under 35 U.S.C. 154(b) by 273 days.

This patent is subject to a terminal disclaimer.

(21) Appl. No.: 14/948,367

(22) Filed: Nov. 22, 2015

(65) Prior Publication Data

US 2016/0078040 A1 Mar. 17, 2016

Related U.S. Application Data

(63) Continuation of application No. 13/679,927, filed on Nov. 16, 2012, now Pat. No. 9,824,363.

(51) Int. Cl.
G06F 15/16 (2006.01)
G06Q 30/00 (2012.01)
H04L 12/58 (2006.01)
G06F 16/11 (2019.01)
G06F 16/245 (2019.01)

(52) U.S. Cl.
CPC ........ *G06Q 30/016* (2013.01); *G06F 16/113* (2019.01); *G06F 16/245* (2019.01); *H04L 51/066* (2013.01); *H04L 51/36* (2013.01); *H04L 51/16* (2013.01)

(58) Field of Classification Search
CPC ..... H04L 51/066; H04L 51/36; G06F 16/245; G06F 16/113; G06Q 30/016
See application file for complete search history.

(56) References Cited

U.S. PATENT DOCUMENTS

| 2002/0099844 | A1* | 7/2002 | Baumann | H04L 47/10 709/232 |
| 2002/0165967 | A1* | 11/2002 | Morgan | G06F 16/9535 709/227 |
| 2006/0028996 | A1* | 2/2006 | Huegen | H04L 63/126 370/252 |
| 2006/0161479 | A1* | 7/2006 | Nashed | G06Q 30/02 705/14.13 |
| 2009/0125377 | A1* | 5/2009 | Somji | G06Q 30/02 705/14.49 |
| 2009/0216579 | A1* | 8/2009 | Zen | G06Q 20/12 705/14.1 |

(Continued)

Primary Examiner — Dhairya A Patel
(74) Attorney, Agent, or Firm — Joe Zheng

(57) ABSTRACT

Method and system for online helpdesk are disclosed. According to one embodiment, a CustomerOps platform is designed to provide customer operations to a plurality of businesses large or small. By providing a server or a cluster of servers, various activities (e.g., inquiries and responses) between a user and a business are captured and the data stream thereof is archived to a designated server. The stored data can be retrieved to view the various activities so as to engage the user contextually whenever there is a need. Such a CustomerOps platform facilitates efficient and more relevant human or automated assistance when the user desires to get engaged with the business that provides a service/product interesting to the user.

11 Claims, 17 Drawing Sheets

(56) References Cited

U.S. PATENT DOCUMENTS

| | | | |
|---|---|---|---|
| 2011/0119182 A1* | 5/2011 | Smolkin | G06Q 20/105 |
| | | | 705/41 |
| 2011/0191179 A1* | 8/2011 | Linietsky | G06Q 30/0255 |
| | | | 705/14.53 |
| 2012/0023245 A1* | 1/2012 | Mouquet | H04L 65/1006 |
| | | | 709/228 |
| 2012/0061465 A1* | 3/2012 | Luo | G06K 7/10237 |
| | | | 235/380 |
| 2012/0310752 A1* | 12/2012 | Gaddis | G06Q 30/0241 |
| | | | 705/14.73 |
| 2013/0073336 A1* | 3/2013 | Heath | G06Q 30/02 |
| | | | 705/7.29 |
| 2014/0149199 A1* | 5/2014 | Oliveira | G06Q 30/0226 |
| | | | 705/14.33 |

* cited by examiner

```
<script type="text/javascript">
var _support = {
  account: 'ronin',
  id: '582',
  name: 'Example User',
  email: 'eo3x0@hotmail.com',
  facebook: 123213123123,
  twitter: 'eo3x0',
  phone: '123-456-7890',
  avatar: 'https://secure.gravatar.com/avatar/4ade004cf37adbf6623bca908bc909697?rating=PG&size=96&default=https%3A%2F%2Fwww.roninapp.com%2Fsystem%2Fuser_uploaded%2Favatars%2F582%2Fthumb%2FScreen_shot_2010-08-06_at_12.46.24_AM.png', authkey: 'fb79ff3307c82f800c79b42895fc65d06ddaf4a05d90a68e90e039928658eb09',
  created: '2008-11-26',
  data: {
    host: "example.roninapp.com",
    plan: "pro",
    next_billing: "",
    staff: "3",
    clients: "10",
    invoices: "178",
    admin: true
  },
  ui: {
    type: 'popup',
    trigger: '#support-link,#feedback-link'
  }
}
</script>
```

160

FIG. 1D identifier | activities 220

16253641NA  09/11/2012: Main (13:26); Clothing (13:40) "Summer Clearance" (13:41); Click on "Jaclyn Smith Women's Tied-Back Tankini Top", JCTop (13:42, phone1, enlarged view, "Fit", 'Color"), Click on "Envya Envya Stria Boyshort Bikini", ...
222

MikeDoe21  09/12/2012: Facebook: profile: "Helen: check out the mossimo tank top on Bestdeal", Helen: profile: "cool, good price", Mike "I will get one for mu bro", ...
224

HelenWise2  09/12/2012: Facebook: profile: added as a member, Click on "BestDeal", Mail (15:32) ......
226

*FIG. 2B*

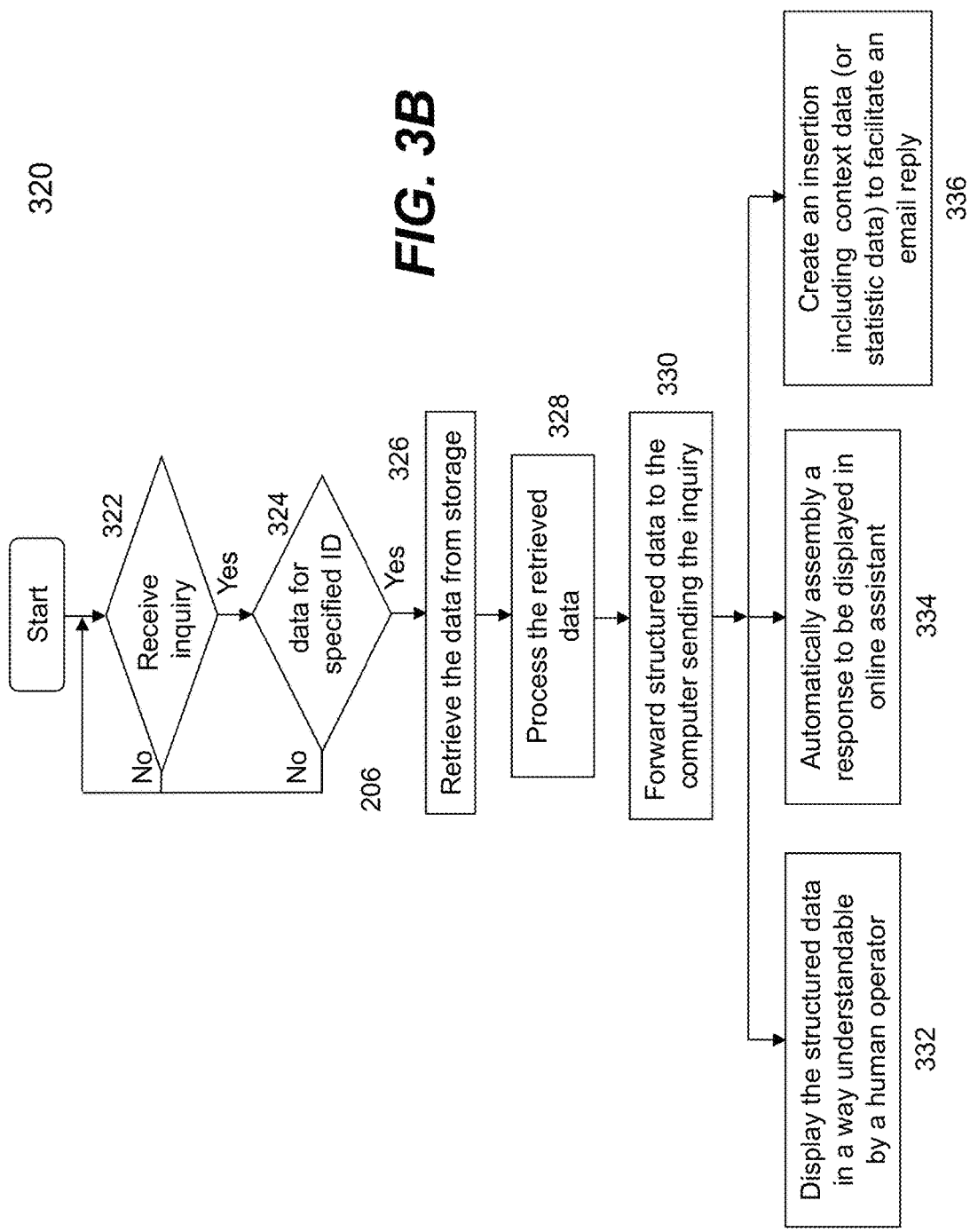

352

Example embedded data from Company 1 at two different times:

{
  account: 'abcstore',
  id: '582',
  name: 'John Smith',
  email: 'jsmith@aol.com',
  facebook: 1232131123123,
  twitter: 'jsmith',
  phone: '123-456-7890',
  created: '2008-11-26',
  data: {
    products_purchased: 10
  },
},

⎫ 353

{
  account: 'abcstore',
  id: '582',
  name: 'John Smith',
  email: 'jsmith@aol.com',
  facebook: 1232131123123,
  twitter: 'jsmith',
  phone: '123-456-7890',
  created: '2008-11-26',
  data: {
    products_purchased: 10,
    products_returned: 1
  },
},

⎫ 354

356

Example embedded data from Company 2 at two different times:

{
  account: 'service',
  id: '582',
  name: 'John Smith',
  email: 'jsmith@aol.com',
  phone: '123-456-7890',
  created: '2008-11-26',
  data: {
    plan: "basic"
  },
},

⎫ 357

{
  account: service ',
  id: '582',
  name: 'John Smith',
  email: 'jsmith@aol.com',
  facebook: 1232131123123,
  twitter: 'jsmith',
  phone: '123-456-7890',
  created: '2008-11-26',
  data: {
    plan: "basic",
    credits_earned: 100
  },
},

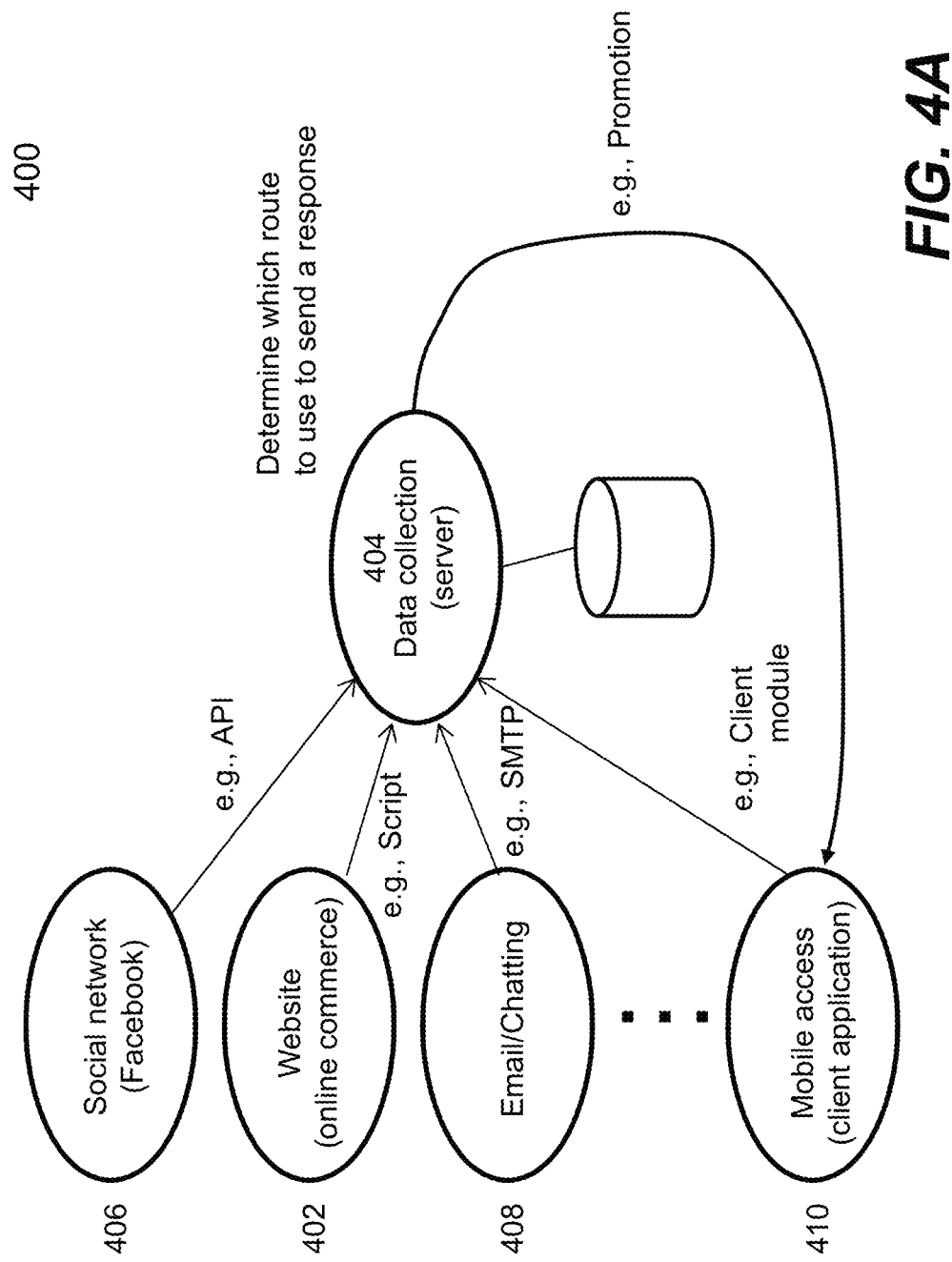

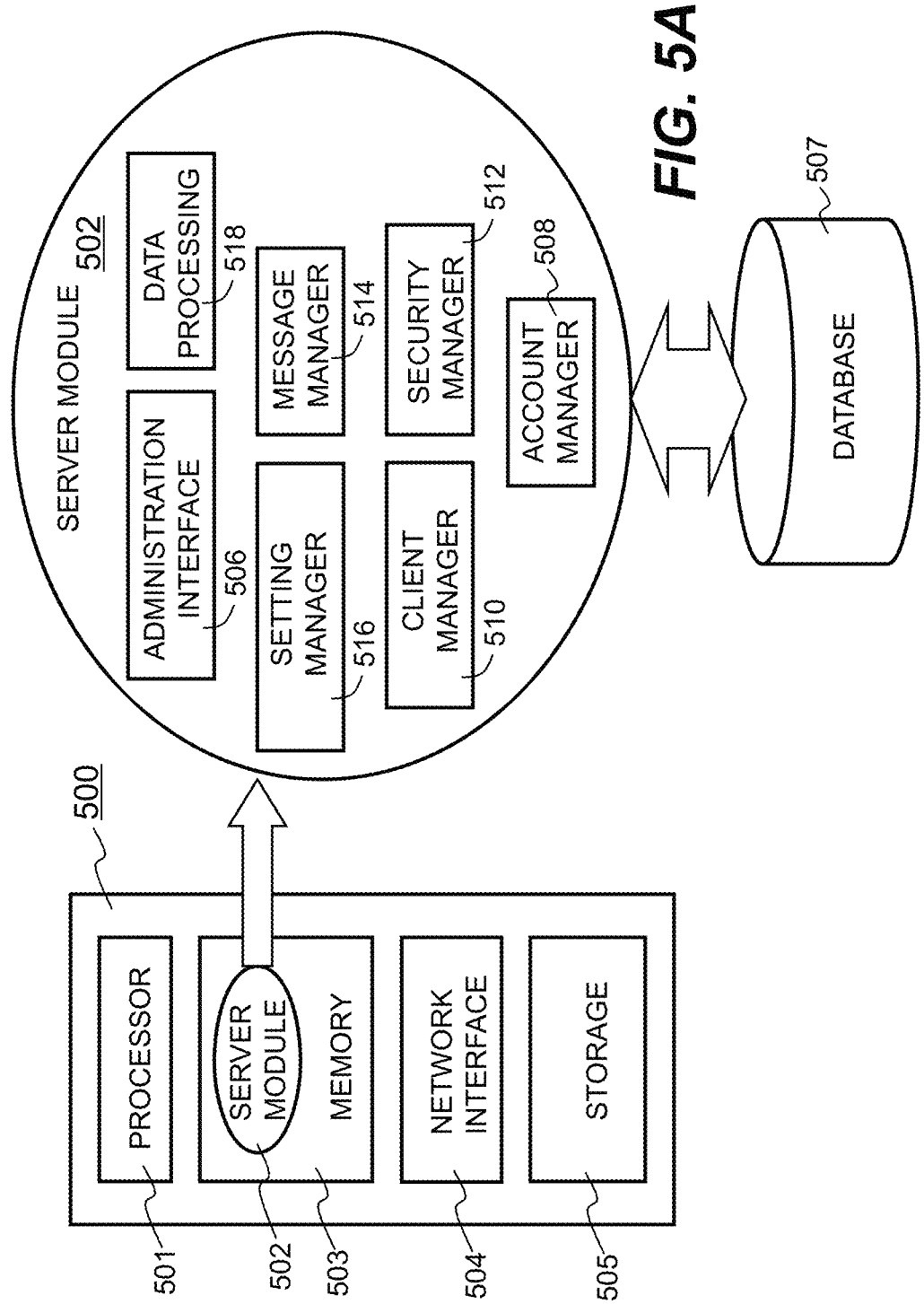

FIG. 5C

METHOD AND SYSTEM FOR ONLINE HELPDESK

BACKGROUND OF THE INVENTION

Field of the Invention

The present invention is related to the area of computer-facilitated communications over networks, and more particularly related to method and system for electronically engaging customers for multiple business entities. In one aspect, the present invention is a customer operations platform (CustomerOps platform) that captures various activities a registered or unregistered user has interacted with a designated computer application (e.g., a website with webpages, a desktop program or a mobile app) and assists the business of the designated application in engaging a targeted subset of users whenever there is a need. Such a CustomerOps platform also facilitates efficient and more relevant human or automated assistance when the user desires to get engaged with the business that operates the designated application.

Description of the Related Art

The Internet is a data communication network of interconnected computers and computer networks around the world and has been rapidly evolving to the point where it combines elements of telecommunications, computing, broadcasting, publishing, commerce, and information services into a revolutionary new business infrastructure. The economy on the Internet is growing in every aspect of life, from buying small items (e.g., stationary) to big items (e.g., vehicles and houses) to trading stocks and ordering services, all via the Internet.

Many traditional businesses, such as local restaurants and clinics, are now all operating online, hoping to grow their businesses by attracting more people to their businesses. Some businesses operate not only in a locale but also is expanding virtually everywhere in the world via the Internet. For a business to increase its profitability, gain its market share, deliver what its customers want and retain repeated customers, an efficient way to facilitate engagement with customers based on known data and attributes about the customer is vital to the business. Such a practice targeted at customers is referred to herein as customer operations (a.k.a., CustomerOps).

Businesses, small or large, need CustomerOps. The success of CustomerOps is not limited to how a customer in electronic commerce is served when there is a need. A CustomerOps platform, in a broad sense, is the use of computer networks to improve organizational performance of a business. It involves all aspects of electronic interactions of an organization with its customers, the people who determine the future of the organization. In brief, A CustomerOps platform involves the use of information technology to engage, enhance communications and transactions with all of its users, regardless of whether or not the users are registered or unregistered.

A CustomerOps platform is difficult to design and costly to operate. Big companies have the resources to engage a special team to design special software to support their own version of CustomerOps, but such specialized CustomerOps solutions are not transferable. That means no other business can reuse the development effort. A small business in reality would not have the resources to develop a specially-designed platform to support their customers. They are often handicapped in customer engagement when competing with their larger competitors on the Internet.

Accordingly, there is a need for a customer engagement platform that can be used by a business, small or large alike, to support its own CustomerOps. Different businesses shall have different types of CustomerOps. Thus there is still another need for a customer engagement platform that is generic enough to support many forms of electronic commerce. Depending on the type of electronic commerce, ways to communicate with customers are different. Thus there is still another need for a customer support platform that is generic enough to support different ways of communication with the customers. These various communication mediums are referred to herein as channels.

Email is a popular communication tool users often use to communicate with a business. For example, a user may want to buy a volume for an interesting item and decide to send an email message to a seller (i.e., a website thereof) inquiring a volume discount. Should collected interaction data indicate that the user has been looking up the item extensively, a decision to offer a discount for a volume order would be justified to quickly close the transaction.

Social networks, such as Facebook (www.facebook.com) and Twitter (www.twitter.com), are becoming prevalent platforms for many businesses to expand their presence among new or their existing users. A traditional CustomerOps solution to support a business would lose its advantages when dealing with the social network data and communications, where the medium for user engagement is no longer controlled by the business. Thus there is still another need for a mechanism that is capable of capturing possible interactions of users with a business page/account on a social network. In addition, businesses now often have many non-web application based presences. These include applications for mobile or other hardware devices. Along with more traditional mediums like SMS and voice, businesses have a myriad of channels that they need to juggle. The need for a CustomerOps solution that enables a business to gather and correlate user data amongst all possible touch points and re-engage users at the right channel is a major pain point for many businesses.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In general, the present invention provides a method and system for electronically engaging customers for multiple business entities. According to one aspect, the present invention is a supporting server or CustomerOps platform that provides customer operations to a plurality of computer applications (e.g. websites with webpages, desktop programs and mobile apps) operated by respective businesses large or small. Various activities by a registered or unregistered user interacting with the computer applications are captured and the data stream is transported to a designated server. The stored data can be retrieved to assist the business of the designated computer application (e.g. website) to engage the user selectively whenever there is a need. Such a CustomerOps platform facilitates efficient and more relevant human or automated assistance when the user interacts with the business that provides the designated computer application (e.g. website).

According to another aspect of the present invention, a supporting server is configured to support multiple businesses operating in wide ranges of businesses and allows a business to send in a set of annotated data or inquiry relevant to the customers and specific to individual businesses. Depending on the area in which the business operates, the annotated data may include information related to subscribed services, successful transactions, expressed interests, or demanded information for some or all of the users who have been interacting with the business. The supporting server requires no specified data structure or schema in the annotated data from any of the businesses being supported and each such business is free to alter the annotated data format at any time. One embodiment of the supporting server as a CustomerOps platform allows the annotated data in plain language and facilitates data processing of the stored data streams in accordance with the annotated data. The supporting server stores and indexes all of the annotated data for later retrieval, wherein retrieval queries ("data retrieval query") may contain arbitrary attributes and values matching specific data provided in the data stream for the purpose of selecting a group of users.

According to still another aspect of the present invention, one or more webpages in a website for online commerce are embedded with a module. The module is activated when a user comes to visit the website. The module is designed to capture selected activities by the user interacting with the website annotated with data provided by the business to generate a data stream. The data stream resulting from the selected activities is transported to a designated device for storage or access at another time.

According to still another aspect of the present invention, the supporting server is configured to access email messages relating to the business. The email messages are parsed and contextual information about the user is extracted to structured data for storage. The data is matched with any supplied email identifiers from the annotated data sent by the business to construct a message history for the user that is conjoined with the associated data streams about that user.

Similarly, the supporting server may be configured to access data available on another (second) server (e.g., a social network website) to obtain communication messages sent by users of the second server. Messages are parsed and contextual information about the user is extracted to structured data for storage. The data is matched with any supplied secondary identifiers from the annotated data sent by the business to construct a message history for the user that is conjoined with the associated data streams about that user.

According to still another aspect of the present invention, an application is provided by a business to be executed on a mobile device. The application is designed to be embedded with a module. The module can be sent annotated data by the embedding application which it transports to a designated server. Also, when the application is accessed the user, the module is activated to monitor how a user is interacting with the application. Various activities by the user with the application being executed on a mobile device are captured and transported to the designated server, where the data from the application may be associated with or added into stored data archived under an identifier of the user who has interacted with the business through its website or the application before. Also, the unique identifier of the user for the purposes of sending asynchronous notifications relevant to the platform of the mobile device is transported to the designed server.

According to still another aspect of the present invention, the stored customer data can be retrieved for view by operators of a business subscribing to the customer operations provided by the supporting server or CustomerOps platform. The stored data may be filtered by matching specific attributes and values provided in the data stream.

According to still another aspect of the present invention, the CustomerOps platform is configured to allow an operator of a business being hosted to create one or more outbound messages for a group of users. A message may be created based on the prior activities of the group of users interacting with a designated application while the group of users is determined by the resulting set of a data retrieval query.

According to still another aspect of the present invention, the CustomerOps platform is configured to allow an operator of a business being hosted to create one or more outbound messages to a specific channel.

According to still another aspect of the present invention, the retrieved data can be processed to form necessary texts in responding to email, questions from an automated assistant and preparing a response in voice. The necessary texts are a representation of aggregated information from the stored data streams.

According to yet another aspect of the present invention, the CustomerOps platform may be installed to host one business, although it is designed to host customer operations for multiple businesses at the same time. By utilizing the capability in one embodiment of the CustomerOps platform to pull data from different sources, a business does not have to develop its own version of customer operations, resulting in significant saving in operating such a platform to engage its users having various activities with the different sources.

The present invention may be implemented in software or in a combination of software and hardware, and practiced as a system, a process, or a method. According to one embodiment, the present invention is a method for providing customer engagement operations to a plurality of websites, the method comprises: receiving a data stream in a server from one of the websites when the one of the websites is accessed by a user, wherein at least one webpage in the one of the websites is embedded with a module that is activated to track activities by the user interacting with the one of the websites; archiving in a data store the data stream per an identifier of the user in reference with the one of the websites; retrieving the data stream per the identifier when there is a request from a business operating the one of the websites, wherein the request includes at least the identifier; filtering the data stream per the request; and reconstructing filtered data from the data stream.

According to one embodiment, the present invention is a method for providing customer engagement operations to a plurality of computer applications, the method comprises: receiving a data stream in a server from one of the computer applications when the one of the computer applications is accessed by a user, wherein at least one application interface in the one of the computer applications is embedded with a module that is activated to track activities by the user interacting with the one of the computer applications; receiving a data stream in a server from one of the computer applications when the one of the computer applications is accessed by a user, wherein at least one application interface in the one of the computer applications is embedded with a module that is activated to track activities by the user interacting with the one of the computer applications; archiving in a data store the data stream per an identifier of the user in reference with the one of the computer applications; retrieving the data stream per the identifier when there is a request from a business entity providing the one of the computer applications, wherein the request includes annotated data from the business entity; filtering the data stream per the request, the filtered data representing statistic measurement of the activities; and reconstructing filtered data from the data stream to show how the user has interacted with the one of the computer applications in a session.

Subject to a business arrangement between the business and the company operating the server, the reconstructing of the filtered data from the data stream may be performed differently. For example, in one case, the statistic measurement of the activities is represented as an aggregated data portion to be inserted in a response to the user. In another case, the filtered data is a report to the business. Further the server is configured to allow the business to communicate with one or more selected users via a selected communication channel (e.g., email, messaging, social network, audio or video).

According to another embodiment, the present invention is a server for providing customer engagement operations to a plurality of computer applications, the server comprises: a network interface to couple the server to a data network and a storage device; a processor; a memory space, coupled to the processor, for storing code, wherein the code is executed by the processor to perform operations of: receiving a data stream in the storage device from one of the computer applications when the one of the computer applications is accessed by a user, wherein at least one application interface in the one of the computer applications is embedded with a module that is activated to track activities by the user interacting with the one of the computer applications; archiving in a data store the data stream per an identifier of the user in reference with the one of the computer applications; retrieving the data stream per the identifier when there is a request from a business entity providing the one of the computer applications, wherein the request includes annotated data from the business entity; filtering the data stream per the request, the filtered data representing statistic measurement of the activities; and reconstructing filtered data from the data stream to show how the user has interacted with the one of the computer applications in a session.

Depending on implementation, the server may be a single designated computing machine or a representation of a cluster of computing devices. The server may be operated by a company engaged in supporting the CustomerOps of multiple businesses or deployed to support the CustomerOps of a single business. The server may be further configured to return various filtered data or reports to the subscribing businesses for their communications with their own users or communicate directly with their respective users on demand from the subscribing businesses.

One of the objects, features, and advantages of the present invention is to provide techniques for supporting a plurality of computer applications to engage their respective users interacting with the applications. Another one of the objects, features, and advantages of the present invention is to provide filtered data to allow a business to communicate with its users more objectively.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1D shows an embodiment of an exemplary module that may be embedded in a webpage (a website);

FIG. 2B shows data streams to illustrate what is captured for three exemplary users;

FIG. 3B shows a flowchart or process of accessing the stored data stream by a business subscribing to the CustomerOps services;

FIG. 3D shows two examples of annotated data, each from a business or a company at two different times;

FIG. 4A shows a configuration of getting data from different resources regarding various interactions by a user with an online business operating a website;

Figure 5C:
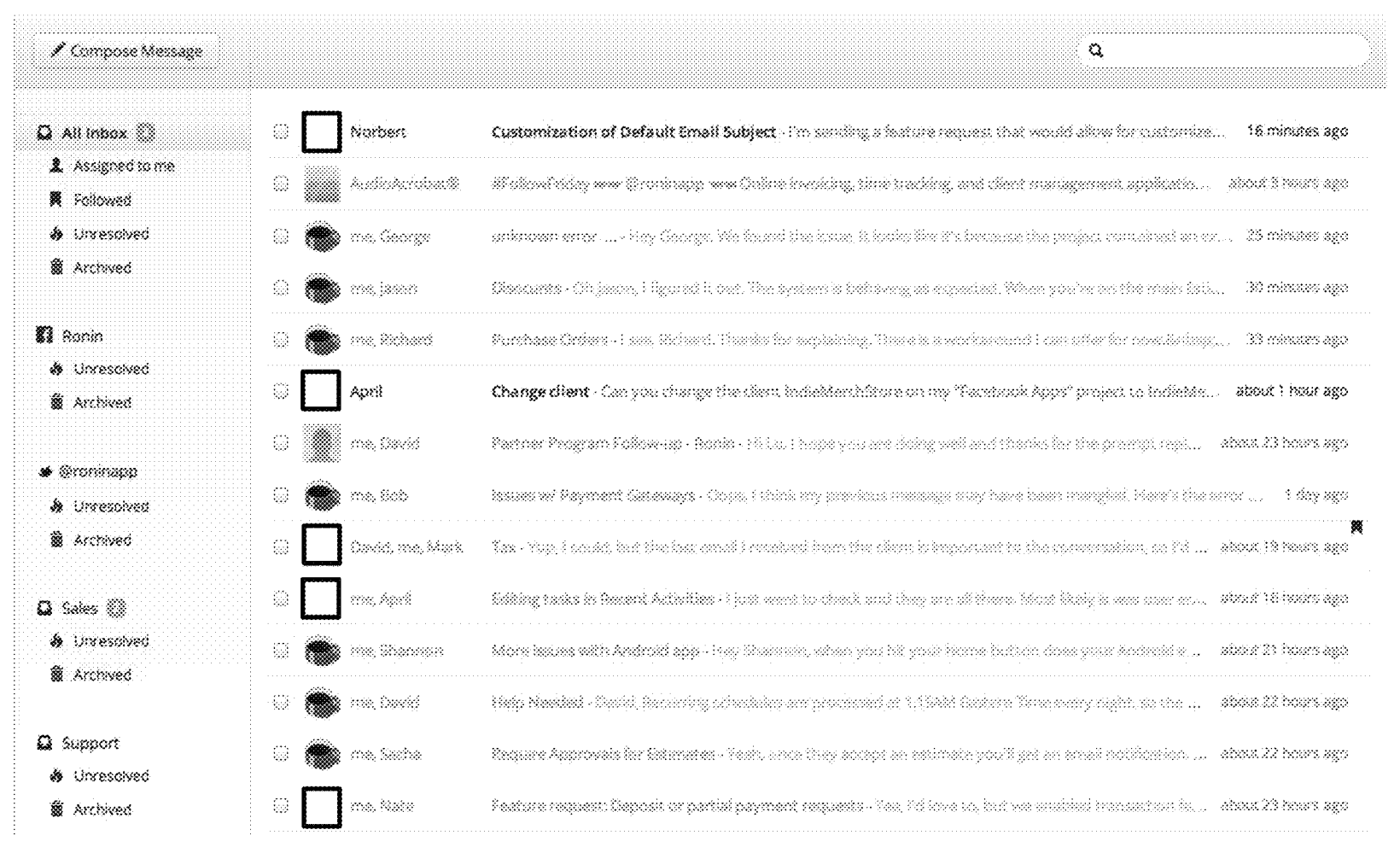

FIG. 5A shows a functional block diagram of a server device in which a server module resides in a memory space and is executable by one or more processors;

FIG. 5C shows a presentation of archived data in accordance with a set of settings (e.g., to show all exchanged texts between a registered user and an operator of a business).

DETAILED DESCRIPTION OF THE PREFERRED EMBODIMENTS

The present invention pertains to a CustomerOps platform that is designed to collect data related to various activities a registered or unregistered user has interacted with a computer application (for example, a designated website or a website related to the designated website) and assist the business of the computer application (for example, the designated website) to engage the user selectively whenever there is a need. The CustomerOps platform contemplated in the present invention facilitates an entity or a business to support businesses, small or large, for engaging their respective users (e.g., customers). By using one embodiment of the CustomerOps platform, an online business does not have to develop its own version of customer operations to engage its users. There is no or little internal support needed to use such a platform. All interactions between a user and a website as well as between a user and a human operator related to the website are retained within the platform.

The detailed description of the present invention is presented largely in terms of procedures, steps, logic blocks, processing, or other symbolic representations that directly or indirectly resemble the operations of data processing devices. These descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
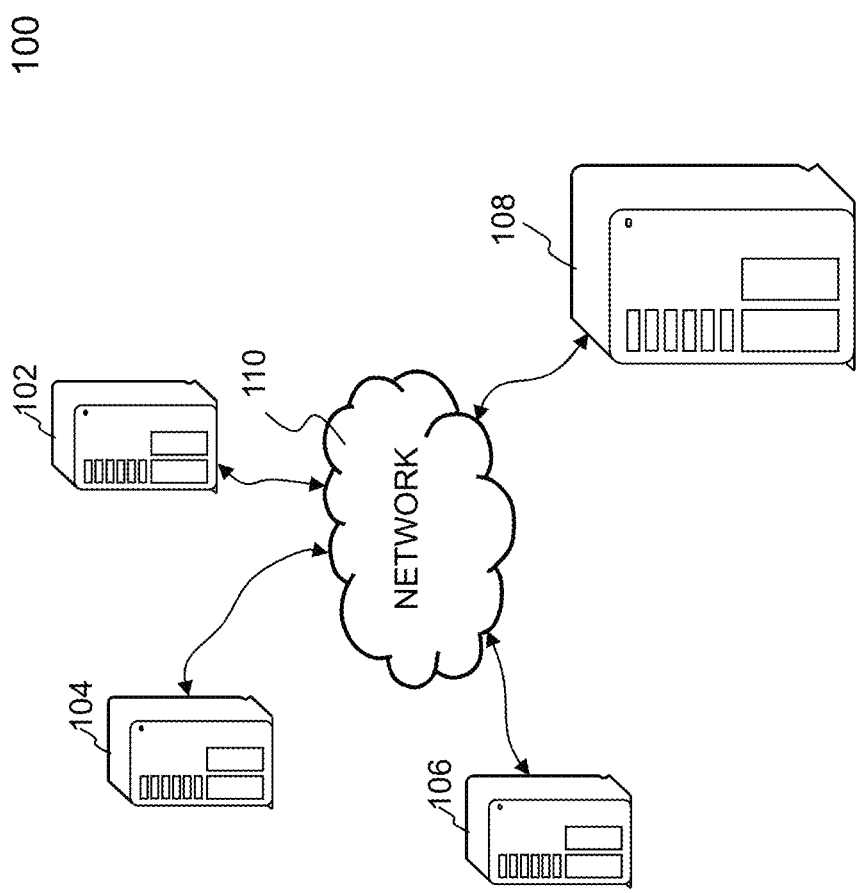
FIG. 1A shows a basic system configuration 100 in which the present invention may be practiced in accordance with one embodiment thereof.

Referring now to the drawings, in which like numerals refer to like parts throughout the several views. FIG. 1A shows a basic system configuration 100 in which the present invention may be practiced in accordance with one embodiment thereof. There are many computing machines executing applications operated by business entities to provide specific functions that involve customer interaction, shown as three exemplary devices 102, 104 and 106. For example, a clothing online store allows a prospective customer to navigate its website to see all latest styles in a particular category, choose proper sizes and colors, and ask questions before an order is probably placed via the website or the clothing online store directly.

In general, customers are one set of users as far as an application is concerned. Depending on the functions of the application, users may have different needs to interact with the application. For example, when a user goes on shopping on a website, the user is often referred to as a customer. As another example, when a user reads books on an e-reader application such a user is often referred to as a reader. Without implied limitations, customers or users will be used interchangeably herein as the description herein is largely based upon the application specific to a business. Those skilled in the art shall appreciate the description herein is equally applicable to other types of applications. The term "website" or "websites" referenced herein serve as example type of application.

FIG. 1A further shows that there is another computing machine or server shown as 108. It is implemented with one embodiment of the present invention. As will be further detailed below, the server 108 is configured to provide a customer operations platform. To facilitate the description of the present invention, any of the servers 102, 104 and 106 is referred to herein interchangeably as a business server or a client machine with respect to the server 108 while the server 108 is referred to herein as a CustomerOps server or simply a server machine. It should be noted that the naming of these machines or computing devices 102, 104, 106 and 108 has no inherent limitations. As will be appreciated to those skilled in the art, any computing devices (e.g., server, desktop computer, laptop computer, tablet or mobile device) can be used as one of the computing devices 102, 104, 106 and 108 and configured to perform some or all of the functions contemplated in the present invention. In one embodiment, a commercially available server computer is configured to fulfill the functions provided by the server 108 and enable the interactions and data flows between the server 108 and any of the client machines 102, 104 and 106.

The servers 102, 104, 106 and 108 are all coupled to a data network 110 (e.g., the Internet, a wired or wireless network or a combination of wired and wireless networks).

As will be further detailed below, the server 108 may also be configured to access data available on other servers, such as an external social network. In one embodiment, the profile of the user in the social network may also be captured to facilitate the business entity to engage with the user in a contextual way.

Figure 1B:
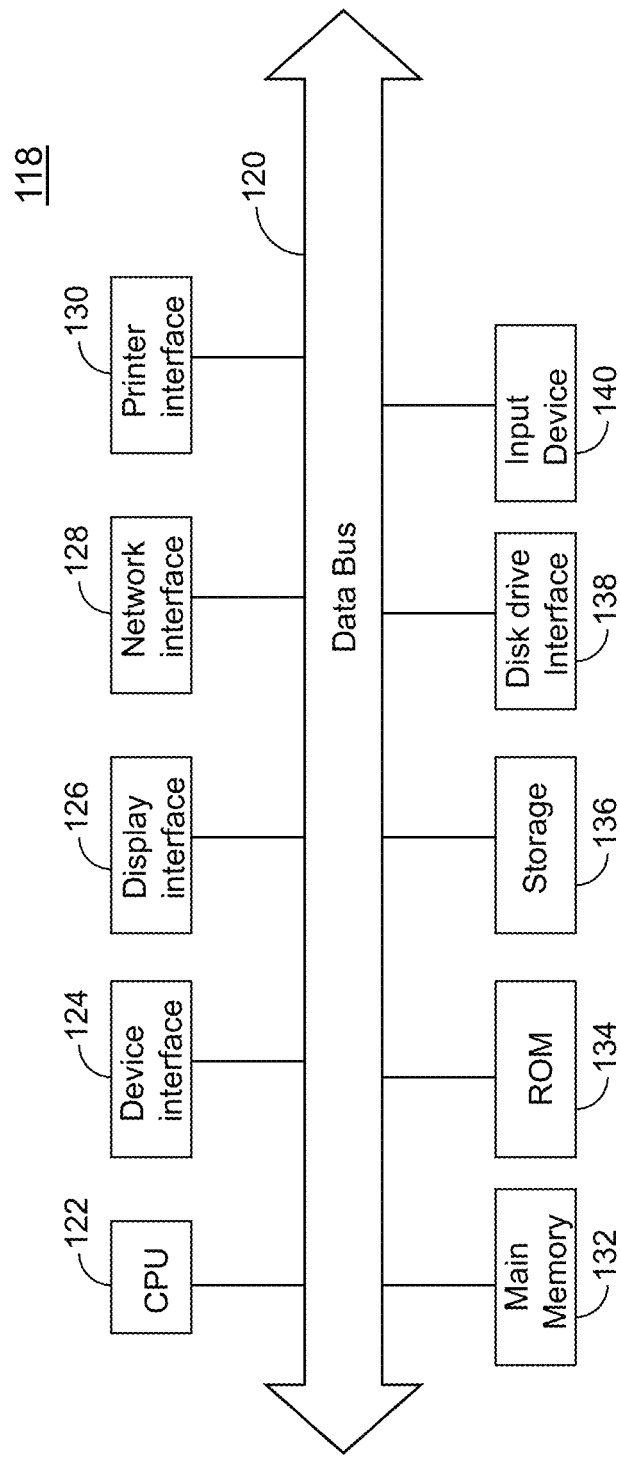
FIG. 1B shows exemplary internal construction blocks of a computing machine in which one embodiment of the present invention may be implemented and executed therein.

FIG. 1B shows exemplary internal construction blocks of a computing machine 118 in which one embodiment of the present invention may be implemented and executed therein. The machine 118 may correspond to one of the servers shown in FIG. 1A. As shown in FIG. 1B, the machine 118 includes a central processing unit (CPU) 122 interfaced to a data bus 120 and a device interface 124. The CPU 122 executes certain instructions to manage all devices and interfaces coupled to data bus 120 for synchronized operations. The device interface 124 may be coupled to an external device such as another computing machine hence one or more resources in the computing machine may be utilized. Also interfaced to the data bus 120 is a network interface 128, and a disk drive interface 138. Optionally interfaced to the data bus 120 is a display interface 126, a printer interface 130, and one or more input devices 140, such as touch screen, keyboard, or mouse. Generally, a compiled and linked version or an executable version of one embodiment of the present invention is loaded into the storage 136 through the disk drive interface 138, the network interface 128, the device interface 124 or other interfaces coupled to the data bus 120.

The main memory 132 such as random access memory (RAM) is also interfaced to the data bus 120 to provide the CPU 122 with the instructions and access to memory storage 136 for data and other instructions, applications or services. In particular, when executing stored application program instructions, such as the complied and linked version of the present invention, the CPU 122 is caused to manipulate the data to achieve results contemplated by the present invention. The ROM (read only memory) 134 is provided for storing invariant instruction sequences such as a basic input/output operation system (BIOS) for operation of the display 126 and the input device 140, if there is any. In general, the machine 118 is coupled to a network and configured to provide one or more resources to be shared with or executed by another system on the network or simply as an interface to receive data and instructions from a human being.

FIG. 1B is an example of a computing device that may be used in one embodiment of the present invention. It should be noted that not every module shown in FIG. 1B would have to be in a computing device in order to be used in one embodiment of the present invention. Depending on the configuration of a specific computing device, some or all of the modules may be used and sufficient in one embodiment of the present invention.

According to one embodiment, a server module is loaded and executed in a machine (e.g., the server 108 of FIG. 1A) to manage various communications with the business servers and facilitate a business server (e.g., the server 102 of FIG. 1A) to capture various activities by a user with the application thereof, provided the business entity operating the website or the business server has subscribed to the CustomerOps services provided by the supporting or CustomerOps server (i.e., the server 108 of FIG. 1A). From a business perspective, a business entity (e.g., a CustomerOps hosting company) operating the CustomerOps server is a separate company specialized in hosting customer operations to a large number of applications being operated respectively by different business entities. As will be further appreciated below, there are no inherent limitations on the nature of the applications, whether an application is a website or mobile application.

According to one embodiment, one or more executable sections of an application (e.g. webpages in a website) subscribing to the CustomerOps services by the CustomerOps server 108 of FIG. 1A are embedded with one or more executable modules, interfaces, links, or code blocks (hidden or visible), collectively referred to as a module herein. In one embodiment, such a module is a script or a JavaScript snippet.

In another embodiment, the module is made visible to alert a user of the underlying monitoring action. Depending on implementation, such a module may be made in different graphics in connection with the content of a particular user interface element within the application (e.g. webpage on a website). For example, a specific user interface element (e.g., word, logo, or avatar) is shown to attract a user to activate the monitoring action, a voice signal is shown that a voice can be recorded, or a video signal is shown that a video can be captured.

According to one embodiment, when such a module is activated one way or the other, browsing activities (e.g., movements, texts, voices or videos) by a user on the webpage are captured. The user may be a registered or unregistered user. The data capturing the browsing activities is streamed back to a designated computing device or the CustomerOps server for storage or analysis if needed.

Figure 1C:
FIG. 1C shows an exemplary webpage embedded with a module and displayed on a display screen of a mobile device used by a user accessing the webpage.

FIG. 1C shows an exemplary webpage 150 embedded with a module 152 and displayed on a display screen of a mobile device used by a user accessing the webpage 150. When the webpage 150 is caused to be displayed on the mobile device, the embedded module is activated to start automatically capturing how the user is navigating the webpage or the website. For example, a user may click on a displayed item, follow onto a specification thereof and stay on a webpage with quantity or price information. FIG. 1C shows specifically that the user intends to seek an answer from the business operating the website, some or all of the text exchanges, after the user clicks on the module 152, will also be captured. When such a module is activated, a data stream is produced and transported from the website to a designated server: a numeric IP address or explicit DNS resolvable address.

According to another embodiment, the particular data sent to the designated server 108 is annotated with known data about the user specific to the business. To support multiple businesses, the supporting computer is designed to require no specified data structure or schema in the annotated data it can receive. In one embodiment, the annotated data from the business is simply in a plain language (e.g., English). In another embodiment, the annotated data from the business is structured as a nested hash, serialized in a format such as JSON. The supporting server stores and indexes all of the annotated data for later retrieval, wherein retrieval queries may contain arbitrary attributes and values matching specific data provided in the data stream for the purpose of selecting a group of users. FIG. 1D shows an embodiment of an exemplary module using JavaScript to encode annotated data to be sent to the supporting server.

According to another embodiment, certain keys within the annotated data are specified to represent identifiers for various communication channels. These may include, but are not limited to, email address, social network IDs as well as communication tokens or IDs associated with various notification platforms, such as Apple's APNS.

According to another embodiment, a client module implementing one embodiment of the present invention is downloaded and installed in a client computer from which a user is accessing a business website subscribing to the CustomerOps services provided by a CustomerOps server. In operation, whenever the website is accessed or opened in a browser, the client module is activated to start capturing the activities of various interactions by a user with the website. Depending on implementation, such a client module may be downloaded as part of a system module (e.g., an element to an operating system or a program) or upon displaying a specific webpage.

Figure 2A:
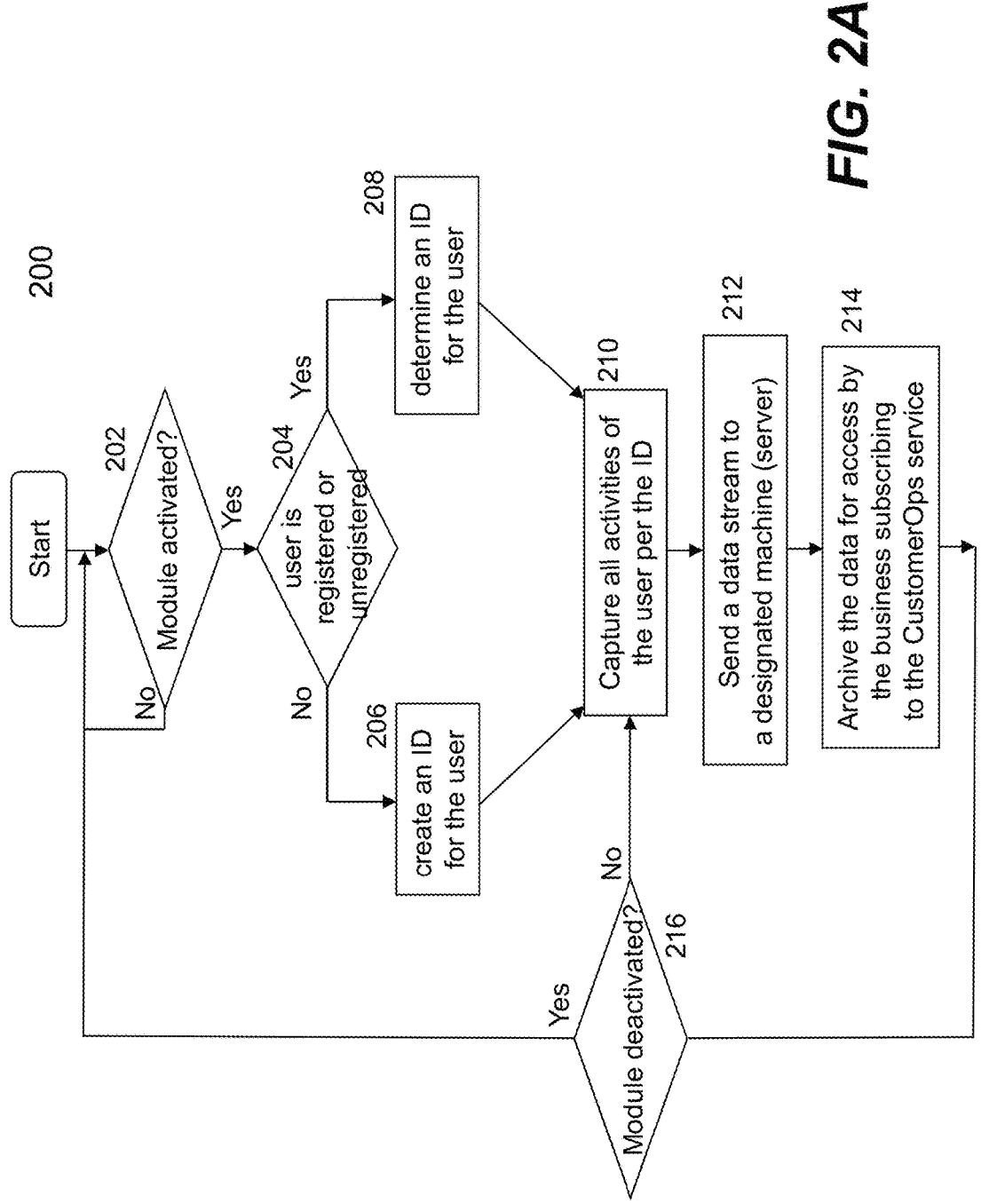
FIG. 2A shows a flowchart or process of capturing activities of various interactions with a website by a user, according to one embodiment of the present invention.

Referring now to FIG. 2A, it shows a flowchart or process 200 of capturing activities of various interactions with a website by a user, according to one embodiment of the present invention. Depending on implementation, the process 200 may be implemented in software or a combination of software and hardware. The process 200 is initiated when a module embedded in one or more webpages is activated. According to one embodiment, the module is embedded in a designated text, such as "online help". When the text is clicked, not only is a proper message displayed accordingly, but also the module is activated. In another embodiment, such a module may also be used to activate a client module installed in the computer being used by the user (user computer). According to yet one embodiment, a module or script is simply embedded in a main page of a website. When the website is accessed, the module or code is activated to immediately track most movements, if not all, by the user across the website.

At 202, it is assumed that an embedded module in a webpage is activated. The process 200 now moves to 204 to determine if a user accessing the webpage or website is registered or unregistered. A registered user is typically a returning user. A unregistered user is considered a first-timer or having not had an account with the website yet. For example, many users buying items from the Amazon website (www.amazon.com) must be registered users. A new user browsing around or happening to be on the Amazon website could be a unregistered user till being registered with the website. Thus at 204, the process 200 goes to 206 when it is detected that it is a new user, where an identifier is created for the new user to link what is going to be captured. Depending on implementation, the identifier could be a unique serial number (e.g., from a network card) or a generated serial number or numeric characters per a set of predefined rules. Likewise, at 204, the process 200 goes to 208 when it is detected that it is a registered user, which typically happens after the user signs into his/her account. At 208, an identifier pertaining to the account is retrieved.

In any case, an identifier is available to be associated with a data stream generated from various interactions by the user with the website. At 210, the interactions are captured while the user is navigating around the website. The examples of the interactions include, but may not be limited to, where or which page the user has viewed or clicked, how long the user has stayed on a particular page, how often the user is switching from one page to another, what particular items the user has viewed and for how long, where the user has clicked and what texts the user has typed. In some advanced websites where voice is supported, the interaction may also include voices from the user and/or the website. These interactions generate a data stream per the session and are transported at 212, often over a data network, to a designated machine (e.g., a server). At 214, the data stream is received in the designated machine and archived in a designated store. Unless the user switches to another website, in which the module is deactivated, the process 200 ends at 216 and will restart from 202, otherwise the process 200 continues from 216 to 210 to capture the movements of the user across the website.

FIG. 2B shows data streams 220 to illustrate what is captured for three exemplary users. As these users are unregistered and do not have assignment identifiers, a tentative identifier is generated and assigned to each event. It is now assumed that a user just arrived at a website of an online clothing store (e.g., www.bestdealclothing.com) selling clothing for all seasons. It is further assumed that the website has already subscribed to the services provided by a CustomerOps hosting company (e.g., the server 108 of FIG. 1A). A module embedded in the website is now activated to capture activities by the user with the website. A data stream 222 is generated by the activities. The data stream 222 identified by 16253641 NA shows that the user started to browse the main page at 13:26 (1:26 PM), then moved to a next page indexed as Clothing at 13:40, where the user has clicked a tab called Summer Clearance. On a webpage for the Summer Clearance, the user clicked on "Jaclyn Smith Women's Tied-Back Tankini Top" at 13:42. The user is also noted to have looked at a phone number, and enlarged a view of the selected cloth and checked out the available size and color. The user then moved onto a next on-sale item "Envya Envya Stria Boyshort Bikini". It should be noted that the captured data is not images of the display of a computer being used by the user. In one embodiment, the activities of the user can be played back based on the data stream to show exactly how the user has interacted with the website.

On the other end, a business operating the website has created an account on a social network site (e.g., Facebook) to attract potential customers. It should be noted that, when a social network site is recited, Facebook will be used for illustration purposes. Similarly, when the business's presence is recited, a Facebook Page will be used for illustration purposes. Those skilled in the art shall appreciate the description can be equally applied to other social network websites (e.g., Twitter.com) and, respectively, the sharing mechanism of such social network website analogous to a Page Wall Post. Since all the users on Facebook are registered, in one embodiment, an identifier for a data stream to capture the activities by a user to interact with the social network account is based on the Facebook username of the user. As an example, a Facebook user Mike Doe is interested in the Facebook Page of the clothing online store. Mike may have added the webpage as one of his favorites via the Like action.

According to one embodiment, the server 108 of FIG. 1A is configured to capture various texts entered or shared by Facebook users coming to the Page. The data stream 224 indexed as MikeDoe21 in FIG. 2B shows that it includes information to show where the data is from. It also shows a published profile of the user on Facebook along with the texts entered by the user and exchanged with another user named Helen. Because Helen and Mike are linked friends, they can exchange texts via email messages, short messages or a whiteboard. As Helen becomes aware of the webpage through the texts from Mike, Helen comes to visit the webpage. All texts left by Helen on the webpage are then captured and transported in another data stream 226 indexed as HelenWise2, where 2 is added to differentiate from another user name Helen Wise. According to another embodiment, the webpage created on a social network website is embedded with a module to capture some or all of the activities by a user interacting with the webpage.

Depending on implementation, application program interfaces (APIs) provided by a social network (e.g., Facebook) may be used to obtain the activities happened on a specified webpage on the social network or a software module may be designed to crawl one or more designated social networks to obtain discussions about a specific business. Such a software module, similar to a web crawling software for search engine, is a computer program that browses the social network in a methodical, automated manner or in an orderly fashion. By using name matching, image matching, or matching previously provided social network identifiers in the annotated data stream, relevant activities from a known user could be captured and associated with already captured data in a store.

One of the important features, objects and advantages in the present invention is to gather all captured data from different sources (e.g., an official business website, one or more other websites/pages related to the official business website and text exchanges (e.g., SM or email) with the official business website and/or a designated website related to the official business website.

Figure 2C:
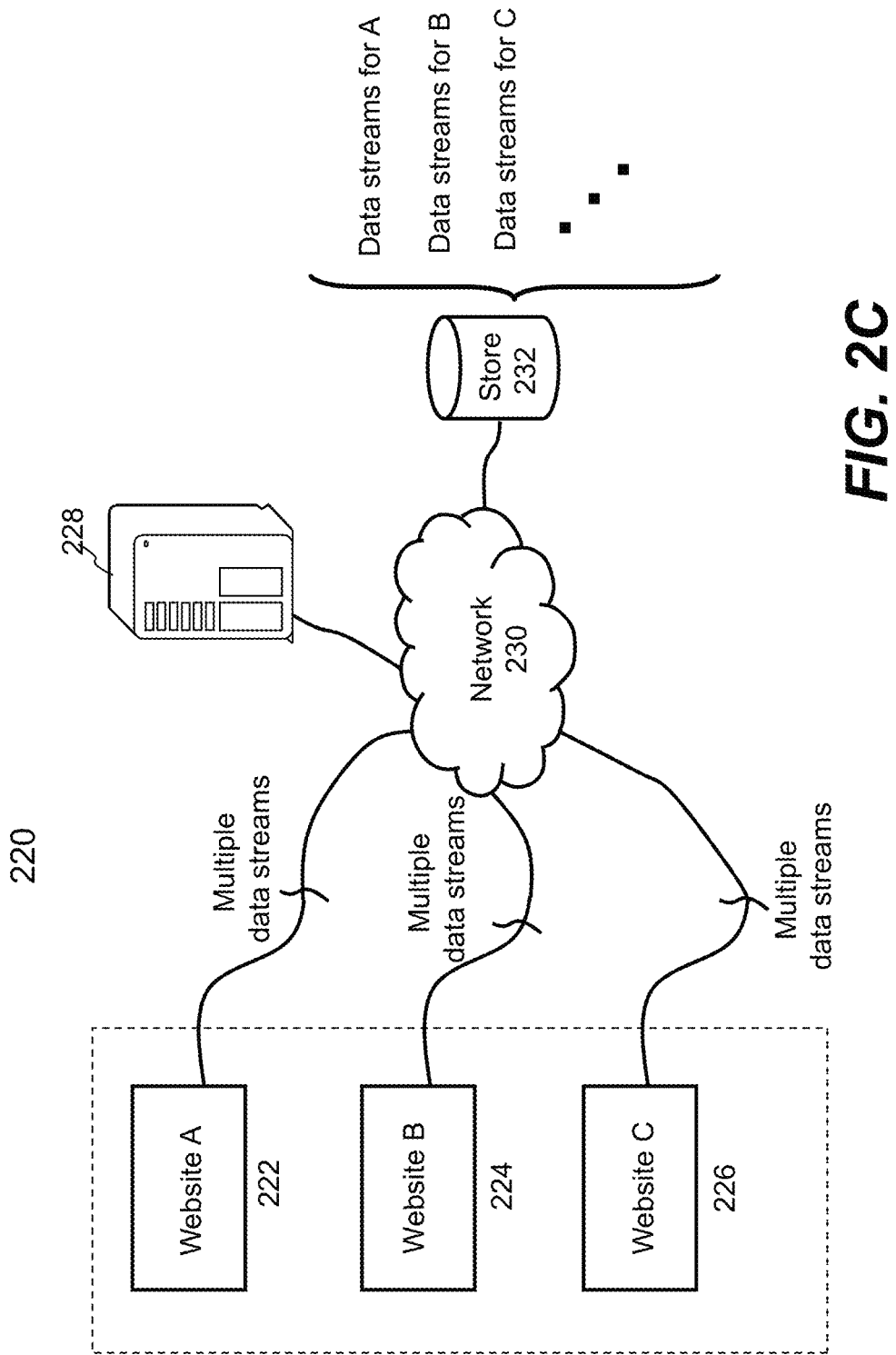
FIG. 2C shows an exemplary configuration corresponding to FIG. 1A.

FIG. 2C shows an exemplary configuration 220 corresponding to FIG. 1A. It is assumed that there are many businesses that have signed up for CustomerOps provided by the CustomerOps server 228 (corresponding to the server 108 of FIG. 1A), although only three websites 222, 224 and 226 are shown as an example. One or more webpages in the websites 222, 224 and 226 are embedded with a module (e.g., script). When any of the webpages is navigated, at least a data stream is generated and transported to the server 228. Since a website can be accessed by multiple users from different locations simultaneously, multiple data streams will be generated and all streamed to one or more designated computing machines controlled or coordinated by the CustomerOps server 228. Depending on implementation, data streams per website are categorized or data streams per time interval are archived separately.

One of the benefits, advantages and objects in the present invention is to provide an efficient and dynamic customer support. Whenever a user contacts a business after browsing its corresponding website, a response can be crafted based on the interactions the user has had with the website. Instead of asking many questions to understand what the user desires, a response more relevant to the need of the user or what the user is asking can be provided by way of two-way communication, such as phone call, online chatting, online automated assistance or email. As will be further detailed below, the archived data streams can be retrieved and presented according to a setting. For example, a setting is to display all conversations that have happened between a named operator (e.g., John Smith working for the business entity operating the website), and another setting is to generate a promotion message based on all registered users who have expressed their certain level of interest in a product.

Figure 3A:
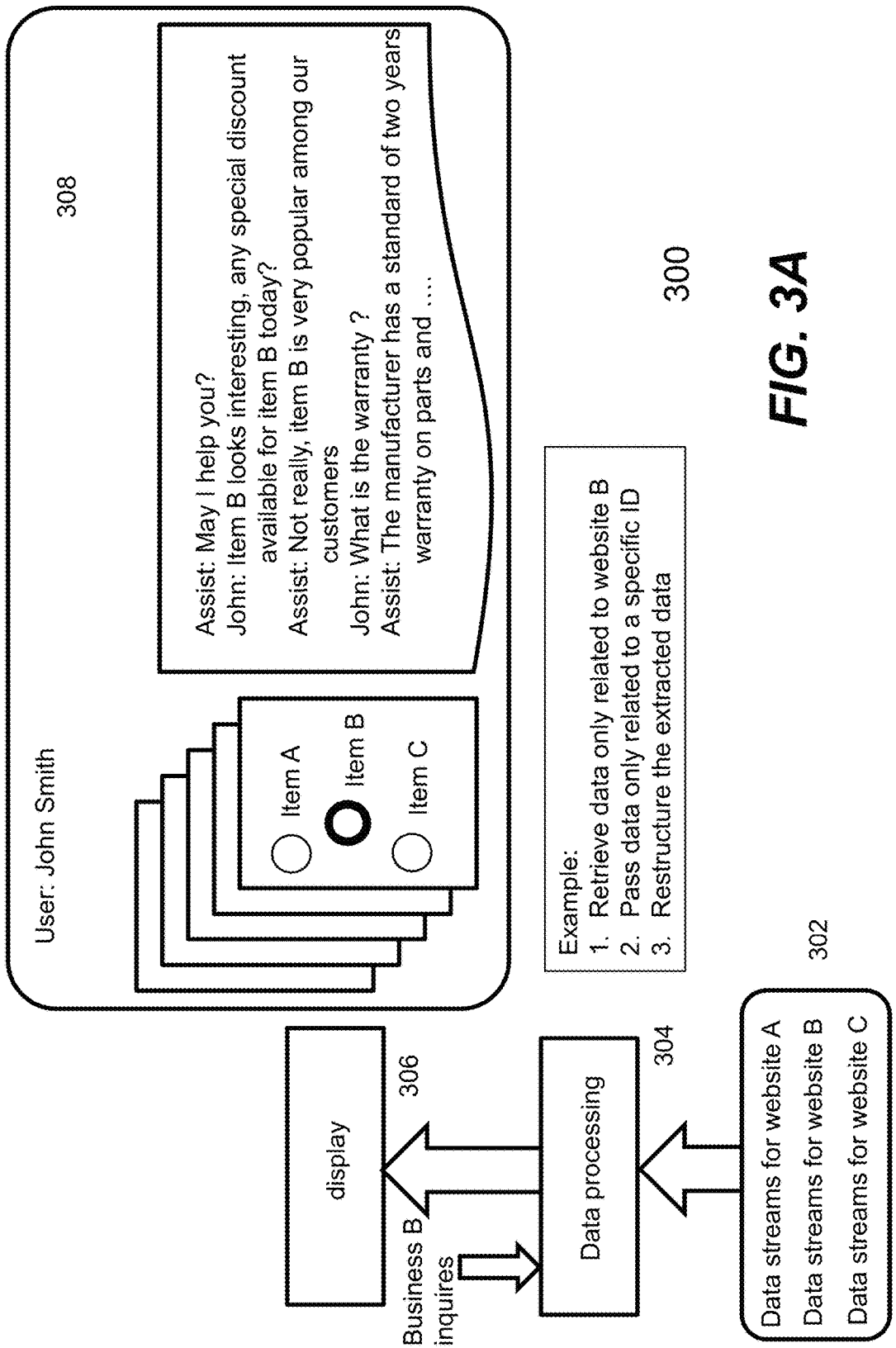
FIG. 3A shows that the data streams are being transported from different sources and stored in a designated store.

Referring now to FIG. 3A, it shows a configuration 300 of how a subscribing business accesses the collected data streams in a store 302 for three websites A, B and C. That means each of the websites A, B and C is subscribed to the CustomerOps services provided by a CustomerOps server (e.g., corresponding to the server 228 of FIG. 2C). It is assumed that a registered user named John Smith has been browsing the website B and decides to call a human operator for more information about an item he has been looking at. When a human operator responds to the call from Smith, the human operator gets the registration information of Smith, assuming Smith is a registered returning customer, the computer being used by the operator (the business computer) is then caused to send an inquiry per the registration information of Smith to the CustomerOps server, where a store 302 is configured to archive all the data from the websites being supported. The CustomerOps server is configured to process the stored data at 304 in responding to the inquiry from the business computer to deliver the data pertaining to the interactions Smith has had with the website so that the human operator knows what Smith has been interested in and how and what to say in the call with Smith.

Depending on how the data streams from all the websites are stored, an example of data processing by the CustomerOps server includes retrieving all data streams from the website B and extracting only the data stream under the identifier related to Smith. The extracted data shall be constructed (in the CustomerOps server or the computer being used by the human operator) before being displayed on a display screen 306. An exemplary screenshot 308 is provided to illustrate what the human operator may see from the extracted data according to one embodiment. Besides showing what pages Smith has navigated, there may be a timestamp for each of the pages that Smith has stayed. In other words, the human operator now has the knowledge about the context of what the user is asking. In one embodiment, a particular item that has attracted the attention from Smith or Smith has spent a considerable time on is highlighted or texted, the human operator knows immediately what interest Smith may have and what is the context of the question Smith is asking. Thus a proper response can be crafted or prepared efficiently to respond to the question.

According to one embodiment of the present invention, FIG. 3B shows a flowchart or process 320 of accessing the stored data stream by a business subscribing to the CustomerOps services. The process 320 may be implemented in software or in a combination of both software and hardware, and starts only when there is an inquiry to access the stored data collected from a particular computer application (e.g. a website, a webpage or a program). In operation, a CustomerOps server is configured to support a plurality of computer applications (websites or programs). In the case of websites, the websites are generating data streams whenever one or more webpages thereof are being visited. In reference to FIG. 3A, it shows that the data streams are stored in a designated store. When a user visiting the website B decides to contact the business operating the website B by way of two-way communication (e.g., email, call or online chatting with a human operator or an automated assistant), an inquiry is generated per a requirement and sent to the CustomerOps server to retrieve data pertaining to the user. An exemplary requirement includes, but may not be limited to, all texts exchanged with a specified user, on a specified social network website, or all emails exchanged with all users that have interacted with a specified website. Consequently, an efficient or more relevant answer response may be generated or prepared for the user based on the filtered data.

Accordingly, at 322, the process 320 determines if such an inquiry has been received. When an inquiry is received at 322, the process 320 goes to 324 to determine if the corresponding data is available per an identifier of the user or per the requirement. In one case, the user is a prospective customer, thus the generated identifier for the user for the particular session is looked up to ensure that there is data available for the identifier. From time to time, a new user may come to a website and decide to contact the business without even browsing any of the webpages, in which case there would be no any identifier associated with the user, thus the process 320 goes from 324 back to 322. In responding to a question from such a user, the response can be structured in a way specifically for a new user, hoping to get the user onto the website and eventually to enter a transaction. In another case, the user is a registered returning customer and the identifier is obtained from the corresponding account for the user.

In any case, once an identifier per the inquiry is confirmed, the process 320 goes to 326 to retrieve the data from the store. As described above, depending on how the data streams from all the data streams are stored, there are many ways to retrieve a particular data set pertaining to the identifier in reference to a setting. As described above, one embodiment of the present invention allows annotated data to be received in any form from the business. Depending on a business arrangement between the subscribing business and the CustomerOps supporting company, such annotated data may be processed differently or the particular data set may be generated differently in accordance with the annotated data. According to one embodiment, the particular data set is a set of statistic measurement for the activities of a user or a group of users. The statistic measurement may indicate where and how often the user has interacted with the website in a period of time, and/or where and how often the user has interacted with an application distributed by the business. In view of the annotated data, the statistic measurement may be carried out to include a royalty indicator (e.g., how often a purchase is made, or a return is requested, if any recent interactions with the business after an event).

In any case, the retrieved data is processed at 328 with or without the annotated data to reproduce the processed data in a predefined structure. In one embodiment, the data is structured in the CustomerOps server according to a predefined set of rules. The structured data is then transported at 330 to a designated computing device being used to respond to the question from the user. In another embodiment, the computing device is installed with a module provided by a business entity in providing such CustomerOps to other businesses for their online commerce, in which case the retrieved data per the identifier of the user is first transported at 330 to the computing device. The module in the computing device is then activated to process and reproduce the data according to a predefined set of rules.

Depending on how the inquiry is generated, there are different ways to respond to the inquiry. As described above, there are often cases in which a user calls directly a business hosting the website, in which case a human operator shall respond to the call. Based on the extracted data from the interactions by the user with the website and the collected annotated data, the human operator is very well prepared to respond to the call in view of what the user has been doing on the website from the retrieved data, or in conjunction with possible prior interactions if the user is a registered returning user.

Some advanced websites now offer an online virtual assistant or online automated assistant that is a program using artificial intelligence to provide customer service or other assistance on a website. Such an assistant may basically consist of a dialog system, an avatar, as well an expert system to provide specific expertise to the user. An automated online assistant has the ability to provide customer services 24 hours a day and 7 days a week, and may, at least, be a complement to customer services by humans. A major underlying technology to such as assistant is natural language processing (NLP) that is a field of computer science, artificial intelligence, and linguistics concerned with the interactions between computers and human (natural) languages. As such, NLP is related to the area of human-computer interaction. Many challenges in NLP involve natural language understanding—that is, enabling computers to derive meaning from human or natural language input.

The main function of the dialog system of automated online assistants is to translate the human-generated input into a digital format that the automated online assistant can use for further processing, as well as interpret whatever solutions or replies it generates back to what a human user understands, and optimally in a way as natural and user-friendly as possible. However, such a dialog system has not been so advanced as desired, and is not helpful and even confusing a user in many cases. Most of the answers are pre-prepared in sentences and assembled on the fly, thus they are not tailored to a specific situation. One of the advantages, benefits and objectives in the present invention is to provide a dynamic online automated assistant that provides relevant responses in view of the activities the user has had in current session or prior session(s).

According to one embodiment of the present invention, one webpage in a website provides a module (e.g., an automated online assistant in text or voice) that may be activated by a user while browsing the website. In operation, the module brings up an interface to facilitate two-way communication (e.g., email, chatting or voice). Depending on implementation, the module may bring up a dialog box for the user to type in a question or a voice sign to receive a voice from the user.

In any case, the two-way interface allows a user to produce a question for a business to answer. In reference to FIG. 3B, the question leads to an inquiry to a CustomerOps server (i.e. supporting computer). According to one embodiment, the inquiry includes, but may not be limited to, information about a domain name of the website or a web IP address, a set of annotated data is supplied by the business or generated per an operator of the business. To support multiple businesses, the supporting computer is designed to require no specified data structure or schema in the annotated data it can receive. In one embodiment, the annotated data from the business is simply in a plain language (e.g., English).

FIG. 3D shows two examples of annotated data, each from a business or a company at two different times. The example 352 shows a first set of annotated data 353 prepared by an online business that needs to check out all activities after the user John Smith has purchased 10 items from the business. Later on in another event to further refine the retrieved data or to query another set of data, the annotated data is prepared as shown in 354, where it indicates the same user except for all activities after 10 purchases and 1 return. Similarly, the example 356 shows a first set of annotated data 357 prepared by a service business that needs to check out all activities with the customer John Smith choosing a basic plan. Later on in another event to further refine the retrieved data or to query another set of data, the annotated data is prepared as shown in 358 to retrieve activities after the user has earned 100 credits.

Figure 3C:
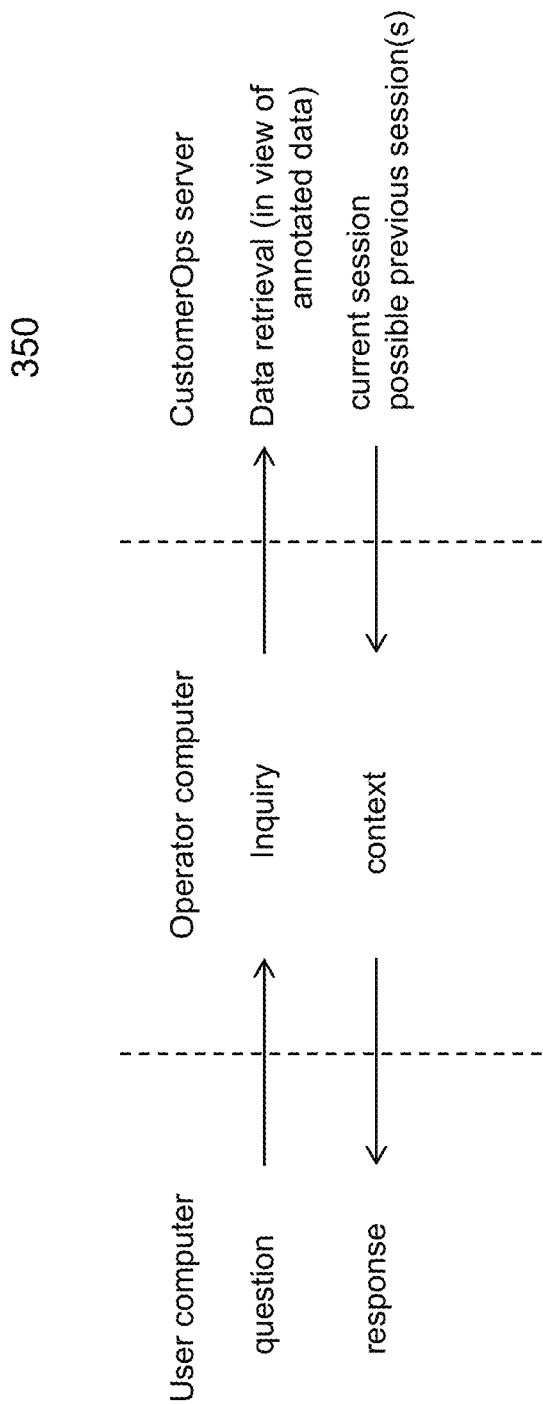
FIG. 3C shows data flows among three devices, a user computer, an operator computer, and a server according to one embodiment of the present invention.

In responding to the inquiry, the CustomerOps server retrieves data for the current session and/or one or more previous sessions in accordance of the annotated data. In any case, the computing device (user computer) being used by the user is caused to send out a question to the website (operator computer) as shown in FIG. 3C. As described above, depending on the status of the user (e.g., registered or unregistered), an inquiry pertaining to the question is generated and sent to the CustomerOps server, where corresponding data per the identifier of the user is retrieved. If it is a registered user, there is likely additional data from previous session(s) that user had interacted with the website.

After the data is extracted, depending on implementation, at 334 the data may be processed in the CustomerOps computer or in the operator computer to create a context around the question. A response is then generated from the context to be sent to the user computer, where the user may see the text or hear the voice to his/her question. The aspect of how to generate such a response is ignored herein to avoid obscuring aspects of the present invention as the embodiment of the present invention is related to how to facilitate to generate a more meaningful response based on the initial question in conjunction with the context from the current session and possible previous session(s). Siri from Apple is one example of online automated assistants.

Figure 3E:
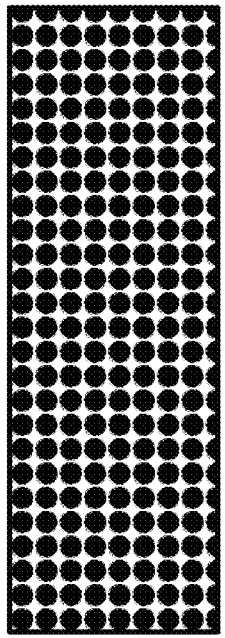
FIG. 3E shows a set of data blocks coming from a restructuring process of the retrieved data from a CustomerOps server to compose a piece of response email.
Figure 3E:
Figure 3E:
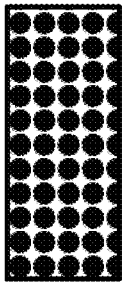
Figure 3E:
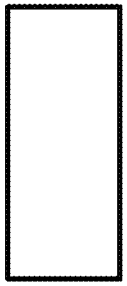
Figure 3E:
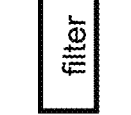

Reference 336 of FIG. 3B indicates another embodiment in which a user has sent an email message to a business for question. As will be further understood below, one embodiment of the present invention can facilitate the response to the email more relevant to the question, whether it is automated or done by a human. Referring now to FIG. 3E, it shows a set of data blocks 362 coming from a restructuring process of the retrieved data from the CustomerOps server. The data set 362 includes one data block 364 representative of the email content from the user. Other blocks may represent the interactions the user had had with the website in a session. When a reply to the email is prepared, a copy of the email content is automatically reproduced in the reply so that the user knows what this replay email is meant. In other words, a process is initiated when data for the context is received in one embodiment of the present invention. The process is configured to filter out other data (tracking) and take only what the user has typed in the email inquiry. As a result, the reply email from the business looks like a commonly seen format in an email reply.

According to one embodiment of the present invention, FIG. 4A shows a configuration 400 of getting data from different resources regarding various interactions by a user with an online business operating a website 402. As described above, activities by the user interacting with the website can be captured, and the data thereof can be transported to a designated server 404. To expand their presences among connected users on a social network, many businesses create a webpage, such as www.facebook.com/amazon created by Amazon and related to www.amazon.com. FIG. 4A shows that a webpage 406 is created on a social network website. The webpage 406 allows users who visit the business page to write comments directly thereon or write comments in their own webpages. Even better, connected contacts of these users may follow the comments to visit the business page, thus creating more potential for the company.

According to one embodiment, an application module (not shown) is designed using application programming interfaces (APIs) provided by the social network website and configured to fetch selected data on the business page. At certain point of time or periodically, the server 404 is caused to execute the module that goes to the business page to fetch the selected data. According to one embodiment, the fetched data includes a profile of a user who has visited the business page. Many registered users of a social network publish their own profiles so that others know whether these are the ones to be connected. By getting some or all of a profile under a user, the server 404 may be configured to associate the data with an already stored data stream created by the same user so that the business may better understand the user.

According to another embodiment, the business page in a social network is embedded with a code or module that, once activated, follows the user to get more data of the user regarding his activities about the business. For example, instead of making any comments about a pair of shoes on the business page advertising various fashion shoes, the user goes onto his own whiteboard to write about what he saw in the business page, or text changing with another connected contact. These texts left by the user or exchanged texts may be obtained and transported with his profile to the server 404, where the data is associated or added to the stored data stream indexed by an identifier related to this user.

In any case, a user may exchange email with the business. Since many email tools generate reply email automatically embedded with texts in previous email, capturing a copy of the email would be sufficient to understand what subjects the user has discussed with the business. According to one embodiment, an application module is designed based on Simple Mail Transfer Protocol (SMTP). The application module (not shown) is configured to obtain a copy of the email 408 being exchanged between the user and the business, and causes the server to store the data separately or associate the data with or add the data to the stored data stream indexed by an identifier related to this user. Similarly, a user may use an online chatting tool to chat with the business. A similar implementation may be done to obtain a copy of the exchanged texts for separate storage or the stored data stream indexed by an identifier related to this user.

The module embedded in a webpage may not be activated in some devices. For example, a java-script code may not be activated when an iPad is used to access the webpage. To capture the activities by the user interacting with the webpage or the website, the user may be requested to download an application or module that may be activated to capture the activities taking place on a device 410 that does not support the embedded module. According to one embodiment of the present invention, the module (not shown) is configured to transport the data stream or data capturing the activities to the designated server 404, where the data is separately stored under an identifier related to this user or associated with the stored data stream indexed by an identifier related to this user.

Many businesses distribute specified applications to be used on mobile devices. For example, Amazon.com distributes its own application for users to browse its listed goods on a mobile device (e.g., iPhone or tablet). According to one embodiment, a business distributes an application to allow users to interface electronically with the business, where the application is embedded with a code that captures activities by the user when interacting with the business. For example, the activities include a movement from one tab to another tab, and further navigation into detailed information on a page after clicking onto a tab. The data representing the activities is transported to a designated device whenever the mobile device has a preferable data communication means (e.g., LTE, Wi-Fi or 3G).

As an application of the stored data, FIG. 4A also shows that the server 404 can be configured to respond to the user or send a promotion message to all registered users. According to one embodiment, the server 404 is configured to send a message to a user via a last known device or a most likely used device. As described above, a user may interact with a website using different means (e.g., direct access from a personal computer, indirect access to a webpage on a social network, email or chatting from an email/chatting tool, or even using a device not supporting a module embedded in a webpage). When there is a need to engage with the user, for example, to send a promotion specifically designed based on the past activities of the user, a decision can be made as to which of the means may be appropriate to send such a promotion. The archived data is analyzed to see which means the user has used the most.

Figure 4B:
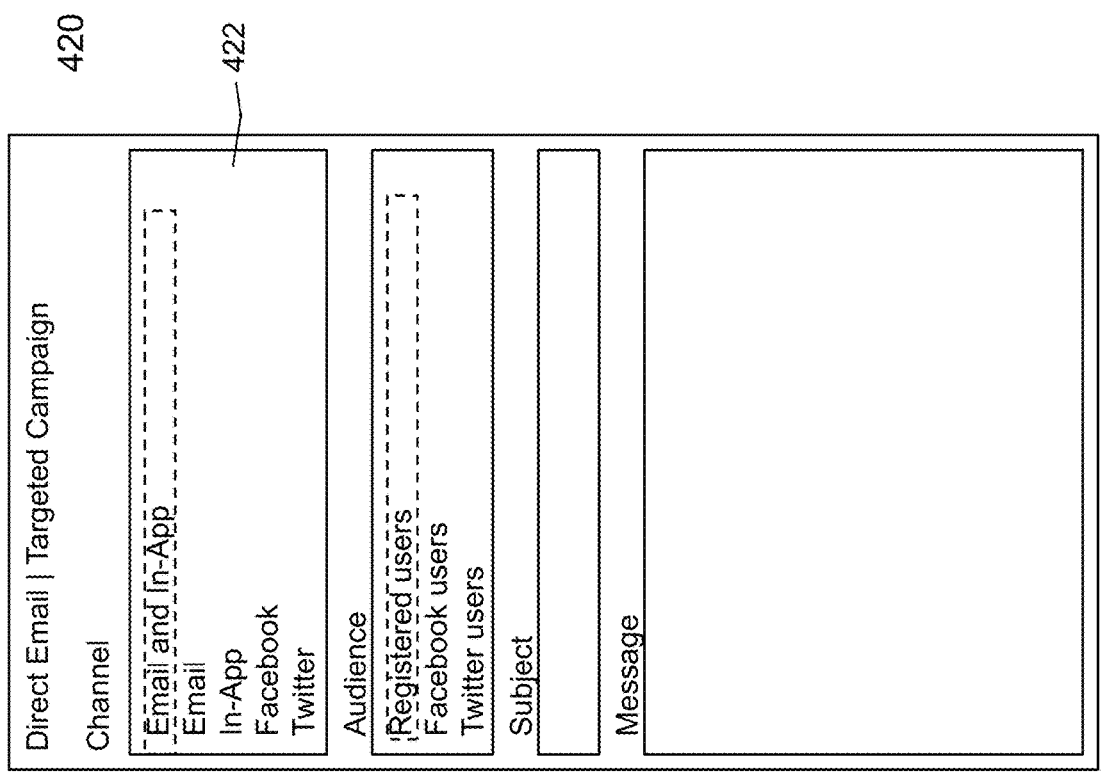
FIG. 4B shows an exemplary interface for an operator of an online business to engage users based on the collected activities data.

In another embodiment, a manual selection is used. FIG. 4B shows an exemplary interface 420 for an operator of an online business having a website. After the operator is logged into the server 404, a set of available channels 422 is displayed to allow the operator to choose an appropriate one to send out a message (e.g., a promotion). Depending on where the business has gathered the data for all of its users, there could be many different channels. Without implying any limitations, the set of available channels 422 shows a few exemplary channels including a combination of two of the examples, where an in-app means criteria matching. That means a promotion is popped out or activated when certain criteria is matched.

For example, the business can set up an "In-App" message from the server 404 for a certain segment of users (e.g., any users who have recently bought more than 3 household items). When such a user hits a webpage, the website or is logged onto a social network, the user is identified as matching a particular segment. When this happens, the user is sent the promotion via a selected channel (e.g., Email, In-App, Facebook, and Twitter). Further, the operator may decide which recipients shall receive the promotion, as a result, the promotion may only be sent to or appear on a corresponding means.

Referring now to FIG. 5A, there is shown a functional block diagram of a server device 500 in which a server module 502 resides in a memory space 503 and is executable by one or more processors 501. Depending on implementation, this server may be a single server or a cluster of two or more servers. One embodiment of the present invention is implemented as cloud computing in which there are multiple computers or servers deployed to serve as many businesses (websites) as practically possible. For illustration purpose, a representative of a single server device 500 is shown and may correspond to the server 108 in FIG. 1A. The server device 500 includes a network interface 504 to facilitate the communication between the server device 500 and other devices on a network and a storage space 505. The server module 502 is an executable version of one embodiment of the present invention and delivers, when executed, some or all of the features/results contemplated in the present invention.

According to one embodiment, the server module 502 comprises an administration interface 506, an account manager 508, a client manager 510, a security manager 512, a message manager 514, a setting manager 516, a data processing module 518.

Administration Interface 506:

As the name suggests, the administration interface 506 facilitates a system administrator to register a business entity subscribing to full customer operations provided by the server 500 and grant respective access privileges to the authorized operators of the business entity. The administration interface 506 is an entry point to the server module from which all sub-modules or the results thereof can be initiated, updated and managed. For example, a business A operating a website subscribes to the services and authorizes its operators A1 and A2 to access the data collected by the server, where the data is uniquely identified (e.g., the business name or the domain name of the website). Likewise, another business B operating a website subscribes to the services and authorizes its operators B1, B2 and B3 to access the data collected by the server, where the data is uniquely identified and only available to the business B. Depending on a business arrangement with the server 500 or a level of the supports being subscribed, the operators of the businesses A and B appear to log into a similar server but access different data sets stored and reconstructing levels. For example, the stored data may be retrieved at a certain level (e.g., for a latest session versus for prior sessions), a reconstructing level controls what contexts can be generated for email response, an automated assistant or a voice response (voice-to-text or text-to-voice).

In one embodiment, an operator sets up and manages one or more of the following processes:

Instant messaging (IM) with a user;
Whiteboard/message exchanging;
Email;
Voice-to-text and Text-to-voice;
Online automated assistant; and
Permission-based remote screen capture to take a snapshot of a display a user is looking at.

Account Manager 508:

The account manager 508 is provided to control who can access the store data. As indicated above, a subscribing business may authorize a number of operators or account managers to access the stored data indexed for the business. The account manager 508 provides a mechanism to control the access. In addition, the account manager 508 is designed to control how the data is accessed in accordance with a setting.

Client Manager 510

The client manager 510 is provided to manage the subscribing businesses. In operation, the client manager 510 controls whether a data stream from a subscribing website shall be archived and how to archive it in a data store. For example, a website is being managed to monitor the activities of users coming to the website, a corresponding webpage is created on a social network. Thus the client manager 510 is configured to send out a module to retrieve data left by registered users from the webpage on the social network and determine how to associate the data with already stored data for the business.

Security Manage 512

This module is configured to provide security when needed. The stored data for each of the subscribing businesses or companies may be encrypted thus only authorized user may access the secured data. In some situations, an encryption key to a secured file is securely maintained and may be retrieved by a system administrator to access a secured document in case there is a need. In one embodiment, the security manage 512 is configured to initiate a secure communication session when it detects that a registered user accesses a file remotely over an open network.

Message Manager 514

The message manager 514 is a tool provided to an operator to generate a message to be sent to a user or a group of users. Based on stored data and an appropriate retrieval query, a promotion may be formed for a specified user, a set of users and all users who have had interactions with the business. FIG. 4B is an example to show that the tool allows the operator to determine what channel to deliver the promotion and who to receive the promotion. In operation, the access to the message manager 514 allows a business subscribing to the services provided by the server 500 to communicate with users, for example, to send promotions through a specified channel. Depending on implementation, a message (e.g., promotion or something else) can be sent generically to all of the users on a specified channel or formed individually and sent to an individual channel via an appropriate channel based on the activities the user has performed.

Figure 5B:
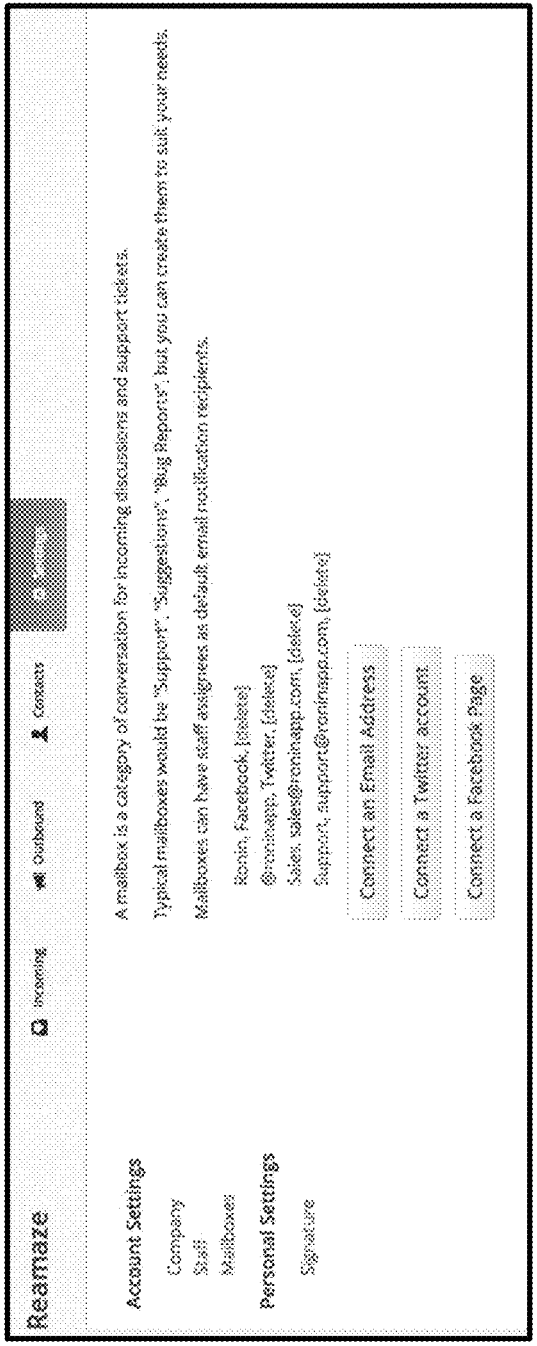
FIG. 5B shows an exemplary display that is provided for a system administrator to control the setting via a graphic interface.

Setting or Rules Manager 516:

This module is primarily used to configure various rules imposed across the system to control communications between the server 500 and a client machine. For example, certain rules are provided to certain websites that may capture displays of computing devices accessing the websites without asking for any permission. This module is also provided to control how a stored data stream is retrieved and processed. For example, when in composing a reply message, a set of parameters could be set up so that the stored data stream is processed to retrieve only texts related to email exchange between a user and a business. FIG. 5B shows an exemplary display that is provided for a system administrator to control the setting. FIG. 5C shows a presentation of archived data in accordance with a set of settings (e.g., to show all exchanged texts between a registered user and an operator of a business).

Data Processing 518:

This module is configured to work with the setting manager 516 to perform data operations per a request from an operator. Whenever there is a request from an operator to access the stored data, this module shall be initiated and get the parameters from the setting manager 516 pertaining to the request to process the stored data and present the data in a way preferred by the operator.

The invention is preferably implemented in software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for providing a helpdesk platform, the method comprising:
    registering a plurality of service providers with a server module being executed on a server, wherein the server module assigns an identifier (ID) to each of the service providers;
    registering with the server module a plurality of users by assigning an identifier (ID) thereto, wherein these users interact with applications provided respectively by the service providers;

archiving in a store automatically data pertaining to activities of how a user has interacted with an application provided by a service provider being one of the registered service providers, wherein the data is captured by a client module per the ID of the user, the client module is embedded in the application, the ID of the user is related to the user but does not reveal exactly who the user is, and the data in the store is not accessible by the user;

identifying by the server module what communication channels the activities have taken place respectively, wherein the data is appended with information of the communication channels including by email, by messaging, by posting on a webpage or by an application;

retrieving some or all of the activities from the store when receiving over a data network an inquiry from the user interfacing with the service provider, wherein the retrieving is performed automatically per the ID of the user;

determining by the server module a communication channel the user is using to generate the inquiry; and responding to the user in a format specific to the communication channel the user has used to create the inquiry in view of the activities retrieved from the store, wherein said responding to the user in a format specific to the communication channel comprises determining characteristics of the communication channel and formatting a response to the inquiry from the user appropriate for transmission in the communication channel, wherein the response includes an input from the service provider and the input is to respond to the inquiry; and transporting the response to the user via the communication channel, wherein the response includes some but not all of the activities from the store, and the user sees from the response a copy of his inquiry and the input from the service provider along with some of the activities in the past.

2. The method as recited in claim 1, wherein the response is created in a way that the user retrieves all of the activities from the store when the user desires so.

3. The method as recited in claim 1, further comprising: archiving automatically the response by appending the response to the copy of activities in the store to update the activities the user has interfaced with the service provider.

4. A method for providing a helpdesk platform, the method comprising:

activating a module embedded in an application provided by a service provider when a user interacts with the application;

sending an inquiry by the module to a server over a data network after the inquiry is created by the user, wherein the inquiry includes an identifier (ID) of the service provider and an ID of the user, the ID of the service provider and the ID of the user are assigned by the server configured to archive automatically in a store data pertaining to activities of how the user has interacted with the application, the ID of the user is related to the user but does not reveal exactly who the user is, and the data is not available to the user, the server executes a server module to identify what communication channels the activities have taken place, the communication channels include at least one or more of by email, by messaging, by posting a webpage or by an application; and receiving from the service provider a response to the inquiry via the server, wherein the server executes the server module to send the response to the user via one of the communication channels the user has used to create the inquiry, the response is formatted specifically for the one of the communication channels, and the data is automatically updated to include the inquiry, wherein the response includes an input from the service provider and the input is to respond to the inquiry, the response is transported via the communication channel, the response includes some but not all of the activities from the store, and the user sees from the response a copy of his/her inquiry and the input from the service provider along with some of the activities from the past.

5. The method as recited in claim 4, wherein the activities include navigations on different pages in the application.

6. The method as recited in claim 4, wherein the response is created in a way that all of the activities can be retrieved from the store when the user desires so.

7. The method as recited in claim 6, wherein the user sees from the response a copy of his inquiry and the input from the service provider along with all of the activities in the past.

8. A system for providing a helpdesk platform, the system comprising:

a server configured to register a plurality of service providers by assigning an identifier (ID) to each of the service providers and a plurality of users interacting with one of the service providers, wherein the ID of the user is related to the user but does not reveal exactly who the user is, the server configured to perform operations of:

archiving automatically in a store data pertaining to activities of how a user has interacted with an application provided by a registered service provider and identifying what communication channels the activities have taken place respectively, wherein the communication channels includes email, messaging, posting a webpage or an application, the data automatically captured by a client module embedded in the application is appended with information of the communication channels, the data is not available to the user;

retrieving some or all of the activities from the store when receiving over a data network an inquiry from the user interfacing with the application, wherein the retrieving is performed automatically per the ID of the user;

determining what communication channel the user is using to generate the inquiry; and responding to the user in a format specific to the communication channel the user has used to create the inquiry in view of the activities retried from the store, wherein said responding to the user in a format specific to the communication channel comprises determining characteristics of the communication channel and formatting a response to the inquiry from the user appropriate for transmission in the communication channel, wherein the response includes an input from the service provider and the input is to respond to the inquiry; and transporting the response to the user via the communication channel, wherein the response includes some but not all of the activities from the store, and the user sees from the response a copy of his inquiry and the input from the service provider along with some of the activities in the past.

9. The system as recited in claim 8, wherein the user sees from the response a copy of his inquiry and the input from the service provider.

10. The system as recited in claim 8, wherein the user sees from the response a copy of his inquiry and the input from the service provider.

11. The system as recited in claim 8, wherein the operations further comprise: archiving automatically the response by appending the response to the data of activities in the store to update the activities the user has interfaced with the service provider.

* * * * *